(12) United States Patent
Guilmette

(10) Patent No.: US 6,368,498 B1
(45) Date of Patent: Apr. 9, 2002

(54) LIQUID SEPARATOR

(76) Inventor: Paul Guilmette, P.O. Box 13, Canton Center, CT (US) 06020

( * ) Notice: Subject to any disclaimer, the term of this patent is extended or adjusted under 35 U.S.C. 154(b) by 0 days.

(21) Appl. No.: 09/650,868

(22) Filed: Aug. 30, 2000

(51) Int. Cl.[7] .......................... B01D 33/00; B01D 21/24; B01D 11/04; F16T 1/00
(52) U.S. Cl. ...................... 210/123; 210/114; 210/115; 210/123; 210/513; 210/521; 137/172; 422/256; 422/261
(58) Field of Search ................................ 210/123, 232, 210/114–115, 744, 533, 540, 513, 521, 121; 137/172; 422/62, 68.1, 70, 101, 103, 106–107, 255, 256, 261, 265; 208/177–179, 187–188, 339; 196/14.5, 14.52

(56) References Cited

U.S. PATENT DOCUMENTS

| | | | |
|---|---|---|---|
| 3,425,556 A | 2/1969 | Völker | 210/104 |
| 3,784,009 A * | 1/1974 | Maciula | 210/114 |
| 3,948,767 A | 4/1976 | Chapman | 210/20 |
| 3,948,768 A | 4/1976 | Chapman | 210/20 |
| 3,957,641 A | 5/1976 | Jakubek et al. | 210/120 |
| 3,996,136 A | 12/1976 | Jakubek et al. | 210/86 |
| 4,032,444 A | 6/1977 | Wright et al. | 210/86 |
| 4,053,405 A | 10/1977 | DeKeyser et al. | 210/65 |
| 4,132,238 A * | 1/1979 | Clark | 137/172 |
| 4,191,651 A | 3/1980 | Cheysson et al. | 210/265 |
| 4,436,630 A | 3/1984 | Anderson | 210/744 |
| 4,497,714 A | 2/1985 | Harris | 210/788 |
| 4,521,312 A | 6/1985 | Anderson | 210/744 |
| 4,528,094 A | 7/1985 | Scragg | 210/114 |
| 4,580,592 A * | 4/1986 | Clark et al. | 137/172 |
| 4,960,513 A | 10/1990 | Young | 210/104 |
| 5,108,591 A | 4/1992 | Hagan | 210/104 |
| 5,705,056 A | 1/1998 | Scragg | 210/123 |

* cited by examiner

Primary Examiner—Robert J. Warden, Sr.
Assistant Examiner—Monzer R. Chorbaji
(74) Attorney, Agent, or Firm—Libert & Associates; Victor E. Libert

(57) ABSTRACT

A liquid separator (10) for separating two immiscible liquids having different specific gravities, for example, a first liquid comprising water and a second liquid comprising oil. The liquid separator (10) has a housing (12) that defines a separation chamber (14) and liquid inlet (16), a first liquid outlet (18) and a second liquid outlet (20) mounted above the first liquid outlet (18). A float 26 is positioned within separation chamber 14 to translate in the vertical direction and has a specific gravity between that of the first and second liquids so that it floats at approximately the interface (28) between the two liquid phases (30 and 32). Valve closure devices (38 and 40) contact valve seats in the valves 46 and 56 of first and second liquid outlets (18 and 20) to control the flow of separated liquids from separation chamber 14 as determined by the level of the interface (28) and the length of the valve rods (34 and 36).

10 Claims, 4 Drawing Sheets

LIQUID SEPARATOR

BACKGROUND OF THE INVENTION

1. Field of the Invention

The present invention relates to devices for separating a combination of two immiscible liquids. More particularly, the present invention relates to mechanical devices for separating a combination of two immiscible liquids such as a mixture of oil and water as occurs in an oil spill in the ocean.

2. Related Art

U.S. Pat. No. 4,436,630, issued to Anderson on Mar. 13, 1984 and entitled "Apparatus and Method for Separating a Mixture of Two Liquids", discloses an apparatus 10 for separating water from oil. As discussed therein, three floats 28, 30, and 32 are connected to switches 36, 38, and 40 which control the opening of valves 24 and 26 in outlets 16 and 18, respectively. The bottom two floats 28 and 30 will float on the more dense liquid, i.e., water, and the top float 32 will float on any liquid. As described, the water is removed from the outlet 16 and the oil is removed from the outlet 18. The opening and closing of the valves 24 and 26 is determined by the levels of the water and oil in the apparatus. If the apparatus is filled with oil, the lower floats 28 and 30 will not rise but the upper float 32 will open the valve in the upper outlet 18 to allow the oil be removed. When the water rises above the low float 28, the low float rises and opens valve 24 in the lower outlet 16 which allows the water to be removed.

U.S. Pat. No. 4,528,094, issued to Scragg on Jul. 9, 1985 and entitled "Separation of Two Liquids", discloses a device for separating two liquids having different specific gravities. The main outlet 122 is for the second liquid such as oil and is located in the upper part of the device. The mixed liquid enters from inlet 118 and swirls within the chamber 120 which aids in separating the second liquid into the upper part of the chamber 120 and the first liquid L1 to the lower part of the chamber 120. The interface is noted as "I" therein near the float body 130. As the first liquid accumulates therein, it lifts the float body 130 up which causes the stem 136 to lift the surface 176 to engage the link member 170 to open a drain line 158. This causes the fluid in the control chamber 140 to drain out, decreasing the pressure, and this allows the control chamber 140 to rise and opens the outlet 156 to allow the water to drain out. As the water rains out, the float 130 falls and this closes outlet 156.

U.S. Pat. No. 4,960,513, issued to Young on Oct. 2, 1990 and entitled "Separator for Liquids of Different Densities", discloses a liquid separator for water and oil, for example. A float 25 which floats on water controls the operation of valve 16 in the water discharge 15 as well as the pump 24 in the oil discharge pipe 22. A time delay is built into the electronics so that there is sufficient time to allow the oil to separate from the water. As the water level moves the float 25 up, this opens the valve 16 and the water is drained. As the water is drained and the level falls below float 25, this turns the valve 16 off and turns the pump 24 on to remove the oil. The float 25 has a greater specific gravity than the oil.

U.S. Pat. No. 5,108,591, issued to Hagan on Apr. 28, 1992 and entitled "Oil Spill Recovery System", discloses a liquid separator 24 for water and oil, for example, in FIG. 2. The mixture enters the chamber 26 through opening 23 at the top of the chamber 26 to aid in the separation of the oil from the water. A oil pump 30 and a water pump 29 are controlled by a pair of arms 38 and 39 having sensor bulbs 40 and 41 thereon, respectively. The sensor bulb 40 is designed to ride on the top of the oil and the sensor bulb 41 is designed to ride at the interface of the oil and water. In both sensors, mercury type switches are used to control the pumps depending on the levels of the water and oil. For example, in the sensor bulb 40, the switch 45 turns the oil pump 30 on when it reaches at a certain level, switch 46 will shut the system down if too much oil and/or liquid is in the chamber 26 and switch 44 turns the oil pump 30 off if it falls to a given level. As to the sensor bulb 41, switch 48 turns the water pump 29 on when it reaches a certain level and switch 47 turns the water pump 29 off if it falls to a certain level. The pumps are positioned in the chamber 26 such that the input fluids are of the given type and a sufficient depth must be reached before any pump will turn on which insures that the oil and water have a sufficient time to separate.

SUMMARY OF THE INVENTION

Generally, the present invention provides a liquid separator for separating a mixture of immiscible liquids comprising a first liquid having a specific gravity which is greater than that of a second liquid. The liquid separator has a housing defining a separation chamber and having a liquid inlet for introducing into the separation chamber a mixture of the first and second liquids. A first liquid outlet is formed in the housing and has a first valve positioned therein to control the flow therethrough of the first liquid, the first valve including a first closure member which is movable between a valve-opening position and a valve-closing position. A second liquid outlet is formed in the housing above the first liquid outlet and has a second valve positioned therein to control the flow therethrough of the second liquid, the second valve having a second closure member which is movable between a valve-opening position and a valve-closing position. At least one float is contained within the separation chamber and is mounted to translate in a vertical direction therein, the float having a specific gravity between the specific gravities of the first liquid and the second liquid. A first valve control member connects the float to the first closure member to move the first closure member (i) from its valve-opening position towards its valve-closing position as the float translates vertically downwardly, and (ii) from its valve-closing position towards its valve-opening position as the float translates vertically upwardly. A second valve control member connects the float to the second closure member to move the second closure member (i) from its valve-opening position towards its valve-closing position as the float translates vertically upwardly, and (ii) from its valve-closing position towards its valve-opening position as the float translates vertically downwardly. In this manner, separation of the mixture of immiscible liquids forms within the separation chamber a discrete phase of the first liquid having a volume $V_1$, a discrete phase of the second liquid having a volume $V_2$, and a liquid interface between the phases that moves vertically within the separation chamber as determined by the respective volumes of the separated first and second liquids contained therein. Such vertical movement imposed on the float serves to close the second valve when $V_1/V_2$ exceeds a first selected value, and serves to close the first valve when $V_1/V_2$ is below a second selected value which is less than the first selected value.

In another aspect of the invention, the liquid separator further includes a guide device mounted within the separation chamber, the valve control members being received within the guide device to align the first and second valve closure members with, respectively, the first and second valves.

In yet another aspect of the invention, the first valve control member comprises a first valve rod, and the second valve control member comprises a second valve rod.

A further aspect of the invention provides that the liquid separator further comprises a float guide attached to the housing within the separation chamber, the float being slidably attached to the float guide to guide movement of the float and thereby movement of the first and second valve control members to align the first and second closure members with, respectively, the first and second valves.

Other aspects of the invention provide one or more of the following features, alone or in combination: the valve control member may include at least one flexible connector between the float and at least one valve; one or more baffles may be provided in the separation chamber interposed between the liquid inlet and the second liquid outlet; the first valve may be normally closed and the second valve may be normally open; the liquid inlet may be mounted above the float; one or more drain channels may be provided in the float for the passage of liquid through the float; and a pressure-closing device may be included in the second valve.

DETAILED DESCRIPTION OF THE INVENTION AND PREFERRED EMBODIMENTS THEREOF

Figure 1:
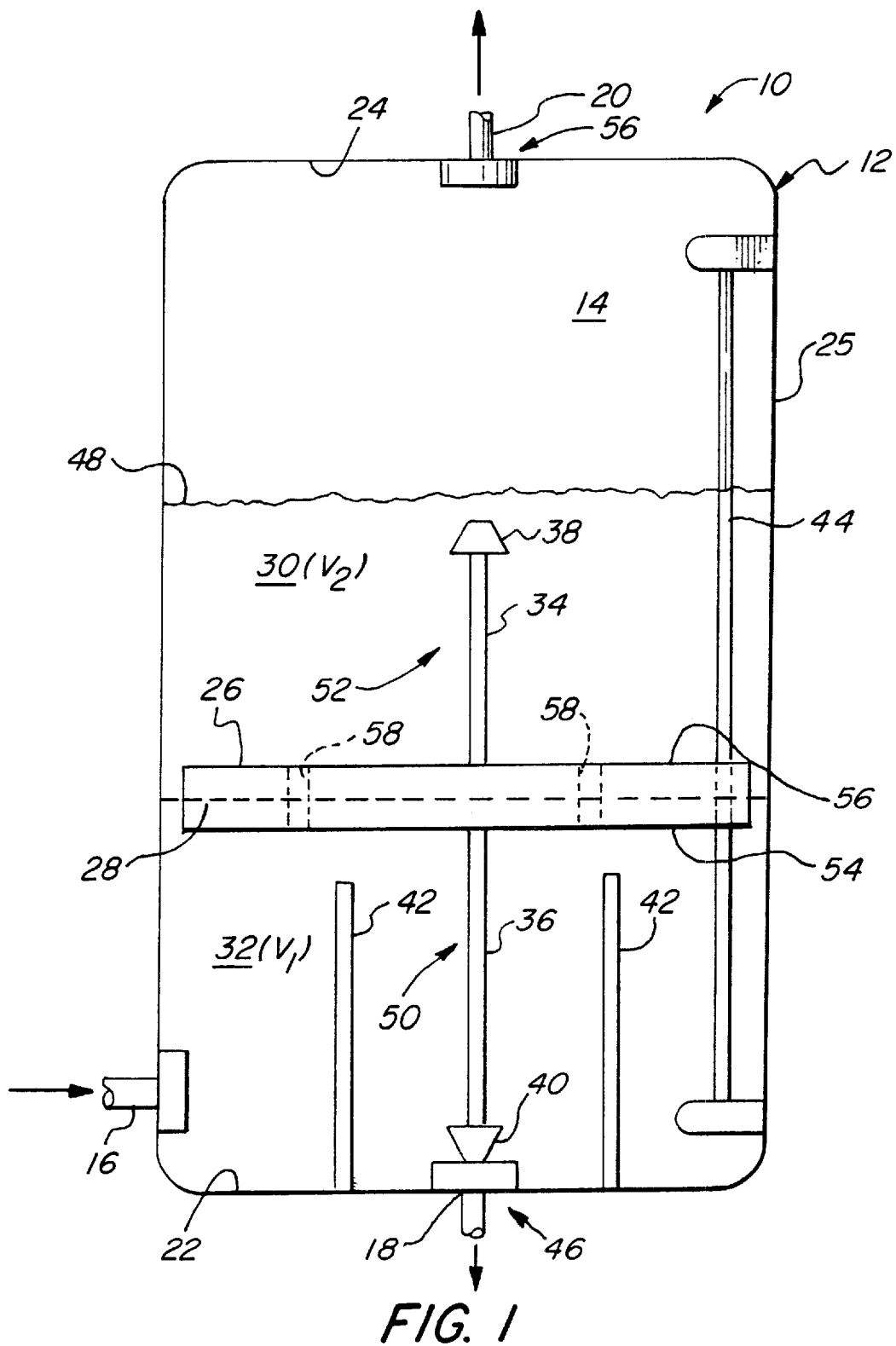
FIG. 1 illustrates a liquid separator comprising an embodiment of the present invention.

Referring to FIG. 1, there is shown a liquid separator 10 for separating two immiscible liquids having different specific gravities such as water, a first liquid, and oil, a second liquid. The liquid separator 10 has a housing 12 comprised of a bottom 22, a top 24 and a sidewall 25 which together define a separation chamber 14. A liquid inlet 16 is connected to the housing 12. A mixture of, for example, oil and water, e.g., crude oil or other petroleum products and salt water, as may occur in an oil spill on the ocean is introduced into the separation chamber 14 via liquid inlet 16 by a pump (not shown) or gravity feed. For convenience, the following description will refer to the separation of oil and water although it will be appreciated that any two liquids which are sufficiently immiscible to separate into two discrete phases, e.g., an oil phase 30 and a water phase 32, may be treated by the illustrated devices. A liquid phase interface 28 is formed between oil phase 30 and water phase 32. A first liquid outlet 18 is mounted in the bottom 22 of the housing 12. A first valve 46 is disposed in the first liquid outlet 18 and will normally be closed until a sufficient volume of water is collected as water phase 32 in the lower portion of separation chamber 14. The second liquid outlet 20 is mounted in the top 24 of the housing 12 and provides an outlet for the less dense liquid, in this case the oil which is collected as oil phase 30. It is to be understood that second liquid outlet 20 could as well be located in sidewall 25 as could first liquid outlet 18, provided only that second liquid outlet 20 is located above first liquid outlet 20 so that second liquid outlet 20 communicates with the oil phase 30 and first liquid outlet 18 communicates with the water phase 32. Liquid inlet 16 and first and liquid outlets 18, 20 may be controlled by valves (not shown). Further, a plurality (not shown) of first liquid outlets may be provided at different levels of sidewall 25 and/or a plurality of second liquid outlets (not shown) may be provided at different levels of sidewall 25. One or more of the plurality of first and second liquid outlets may thus be selected for use depending on the respective volumes of first liquid (e.g., water phase 32) and second liquid (e.g., oil phase 30). The first volume, e.g., the volume of water in water phase 30 is that volume of liquid within separation chamber 14 from the bottom 22 to the liquid phase interface 28, and the second volume, e.g., the volume of oil, is the volume of liquid within separation chamber 14 between the liquid phase interface 28 and the top liquid surface 48.

Within the separation chamber 14, a float 26 is positioned to translate in the vertical direction. The float 26 is designed to have a specific gravity, e.g., a specific gravity of about 0.9, which is less than that of ocean salt water (about 1.03) and greater than that of oil (about 0.8 to 0.7). As a result, float 26 floats at approximately the interface 28 between the two separated liquid phases, oil phase 30 and water phase 32.

The float 26 has a first valve control member 50 attached to the bottom 54 thereof and has a second valve control member 52 attached to the top 56 thereof. As shown in FIG. 1, the first valve control member 50 comprises a first valve rod 36 which has a first valve closure member 40 at the distal end thereof which interacts with the first valve 46 of first liquid outlet 18 thereon. The second valve control member 52 comprises a second valve rod 34 which has a second valve closure member 38 at the distal end thereof. The valve closure members 38 and 40 may be of any suitable shape, such as ball shaped or shaped as a truncated cone, to be received within respective appropriately dimensioned and configured valve seats of first valve 46 and second valve 56 to close the valves to block the flow of liquid from, respectively, the first liquid outlet 18 or the second liquid outlet 20. Which of first valve 46 and second valve 56 is closed and which is open is, of course determined by the respective volumes of the oil phase 30 and the water phase 32, which dictate the level of the interface 28 and therefore the position of float 26, and by the respective lengths of the valve rods 34 and 36. The predetermined lengths of the valve rods 34, 36 are selected to position the valve closure members 38, 40 in selected close proximity to the valve seats. These predetermined lengths of valve rods 34, 36 are selected in the embodiment of FIG. 1 to position the float 28 so that it will not open the first valve 46 in the first liquid outlet 18 until the interface 28 rises sufficiently to cause the float 26 to move vertically upwardly to a selected minimum height above the bottom 22 of the container 12. This will insure that a sufficient amount of water is collected in the lower part of the separation chamber 14 as water phase 32 before first valve 46 is opened.

Figure 4A:
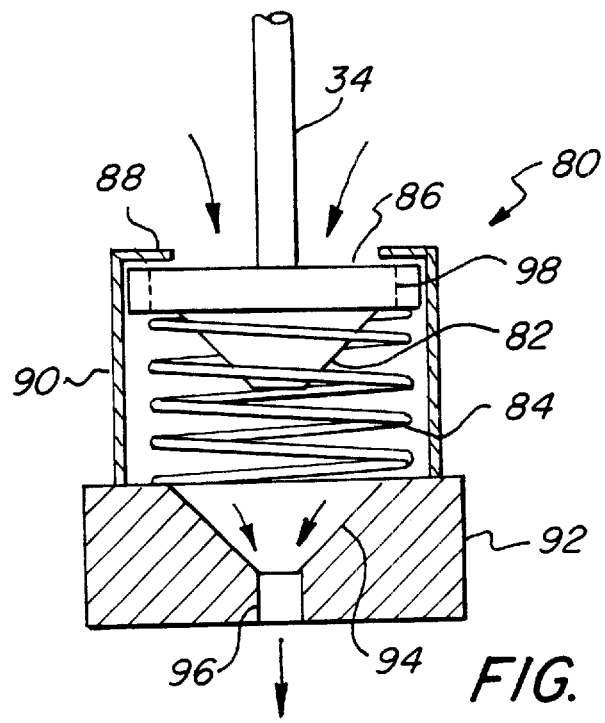
FIGS. 4A and 4B illustrate a normally open valve and a normally closed valve, respectively, used in certain embodiments of the present invention.

In FIG. 1, the first valve 46 is normally closed and the second valve 56 is normally open. FIG. 4A illustrates a normally open valve 56 which may be used, for example, in the liquid separator 10. The second valve 56 has a seat member 92 with a seat 94 therein. An outlet channel 96 allows the fluid to flow in the direction of the arrows when the closure member 82 is not seated thereon. The closure member 82 is contained within a housing 90 having an aperture 88 through which fluids flows. A biasing spring 84 pushes against the seat member 92 and against a closure member flange 86 to normally keep the valve 80 open. The closure member flange 86 may have flow channels 98 therein if there is not sufficient space between flange 86 and the housing 90. If a sufficient pressure head is developed, the pressure will force the flange 86 towards the seat 94 and thus close the valve 56. After the pressure is relieved, the closure member 82 will return to the position as shown in FIG. 4A. Further, the valve rod 34 may force the closing of the valve 56 if a sufficient amount of water causes the interface 28 to lift the float 26 high enough.

As long as the vertical distance between bottom 22 and the liquid phase interface 28 does not exceed the length of the lower valve rod 36, the first valve 46 will remain closed. The ratio of the volume $V_1$ of water phase 32 to the volume $V_2$ of oil phase 30 will determine the level of the liquid phase interface 28 formed by separation of the oil and water into two discrete phases and therefore position the level of the float 26. At an intermediate range of ratios of volume $V_1$ to volume $V_2$ first valve 46 will be opened by withdrawal of first valve closure member 40 therefrom and second valve 56 will remain open because valve closure member 38 is not yet seated therein. For that intermediate range, first valve 46 and second valve 56 will be open simultaneously so that water and oil can be simultaneously discharged through, respectively, first liquid outlet 16 and second liquid outlet 20.

If only oil were input into the separation chamber 14, the float 26 would not rise with the increasing oil level because the density (specific gravity) of the float is greater than that of the oil. Consequently, the first valve 46 would not open and the oil would eventually fill the separation chamber 14 and flow from the second liquid outlet 20 which has the normally open valve 56 therein. If only water were input into the separation chamber 14, the float 26, having a specific gravity less than that of water will float on the surface of the water and the rising level will eventually lift the first valve closure member 40 from the valve seat of first valve 46 to open it and permit the water to exit from first liquid outlet 18. If a sufficiently large volume of water enters separation chamber 14, the increased volume of water phase 32 will raise the interface 28 and thus the float 26 sufficiently high to cause the second valve rod 34, and therefore second valve closure member 38 thereon, to close the second valve 56 which prevents any water from exiting from the second liquid outlet 20.

The height of the separation chamber 14 is desirably sufficiently greater than its width to facilitate separation of a mixture of oil and water into discrete phases and thereby preclude the discharge from first liquid outlet 18 of a mixture of the oil and water. Further, the specific gravity of the float 26 may be such that it will not float until the liquid in the water phase 32 is almost all water, i.e., with very little or no oil mixed therein. The rate of removal of the liquid from first liquid outlet 18 as compared to the volume of separation chamber 14 and the input rate of mixed liquids via liquid inlet 16 will influence the degree of separation of the oil from the water attained prior to removal of liquid from separator 10. Valves may b e used to delay withdrawal of liquid via first liquid outlet 18 to allow sufficient time for the water and oil to separate. Baffles 42 are positioned within separation chamber 14 to divert the mixed first and second liquids entering separation chamber 14 from proceeding directly to first liquid outlet 16 before the liquids have a chance to separate. In a situation in which a large amount of mixed first and second liquids is input quickly into separation chamber 14 there may not be sufficient time for the mixture to separate into discrete liquid phases before liquid begins to discharge from second liquid outlet. In such case, the second valve 20 may have therein a pressure-responsive closing device designed to close the valve when liquid pressure is above a certain level as would occur with the rapid influx of a volume of mixed first and second liquid.

The pressure-responsive closing device will prevent the rapidly in-flowing mixed liquid from flowing from the normally open valve 20.

The float 26 may be designed to contact or nearly contact at its periphery the interior of sidewall 25, so that float 26 slides within the separation chamber 14 much like a piston within a cylinder. In such case a plurality of flow channels 58 are provided in the float 26 to enable the second liquid to pass through the float 26 to reach the second volume of liquid provided by oil phase 30 if the inlet 16 is positioned below the level of float 26. If the inlet 16 is positioned above the level of float 26, i.e., is in the upper end of the separation chamber 14, the first liquid, water, will flow through the flow channels 58 into the first volume of liquid provided by water phase 32. This further aids in the separation of the water from the oil. The float 26 may, alternately or in addition, be slidably connected to a guide rod 44 attached to the housing 12.

Figure 2:
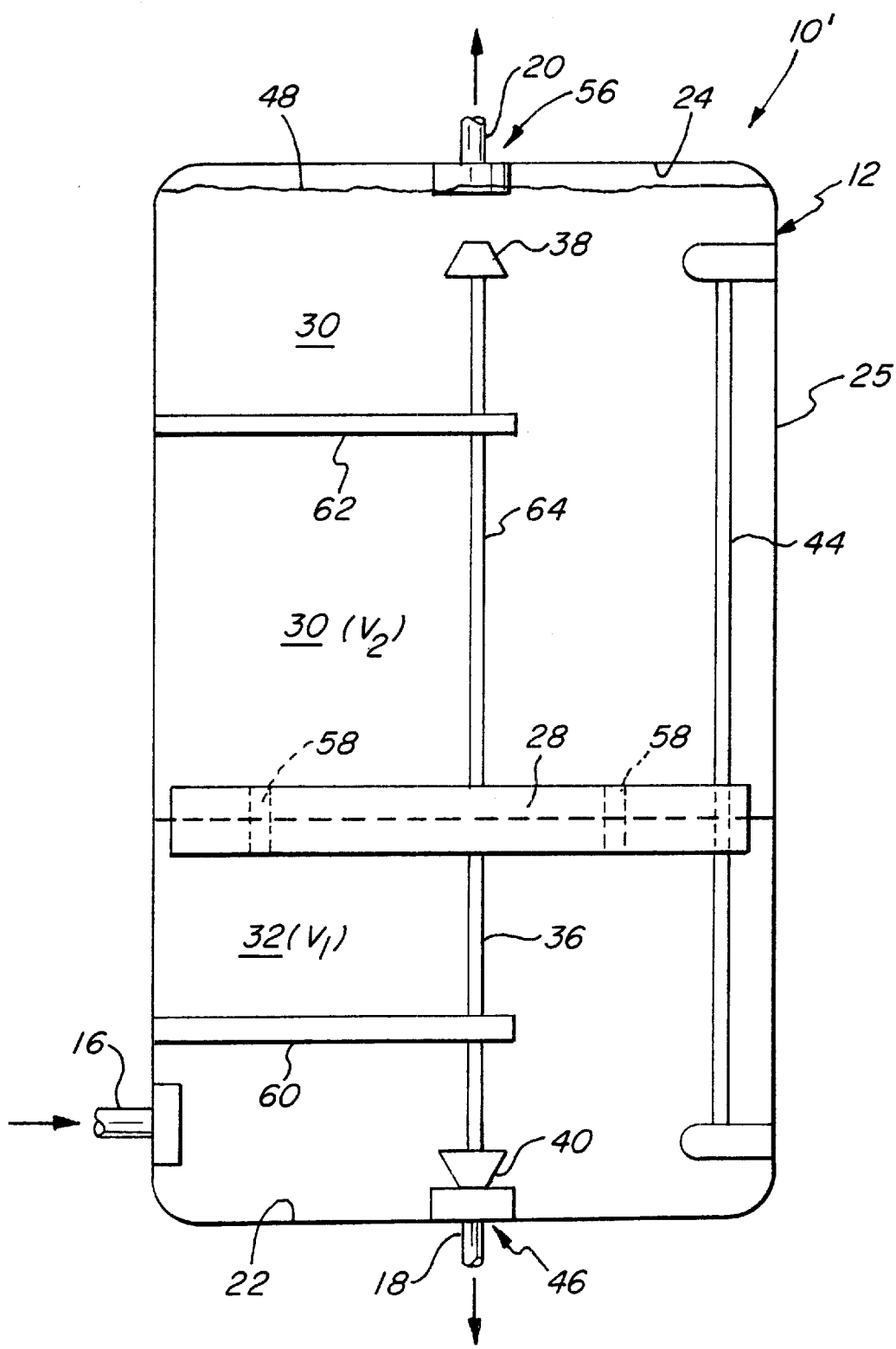
FIG. 2 illustrates a liquid separator comprising a second embodiment of the present invention.

FIG. 2 illustrates a second embodiment of a liquid separator 10 in which movement of the float 26 is guided in the vertical direction by a pair of support arms 60, 62 to which the first and second valve rods 36 and 64 are slidably connected. (The other components of FIG. 2 are numbered identically to those of FIG. 1 and function in substantially the same manner are not further described herein.) Second valve rod 64 is of greater length than first valve rod 36 that places the second valve closure member 38 in much closer proximity to the second valve 56 as compared to the embodiment of FIG. 1. If the proportion of oil to water in the mixture of first and second liquids is low, i.e., the ratio $V_1/V_2$ is low, the relatively large volume of the water phase 32 raises the float 26 in the embodiment shown in FIG. 2, thereby opening first valve 46. This insures that the water is withdrawn via first liquid outlet 18 and that oil accumulates in the second volume $V_1$ of oil phase 30 until the top liquid surface 48 is at or near the second liquid outlet 20.

Figure 3:
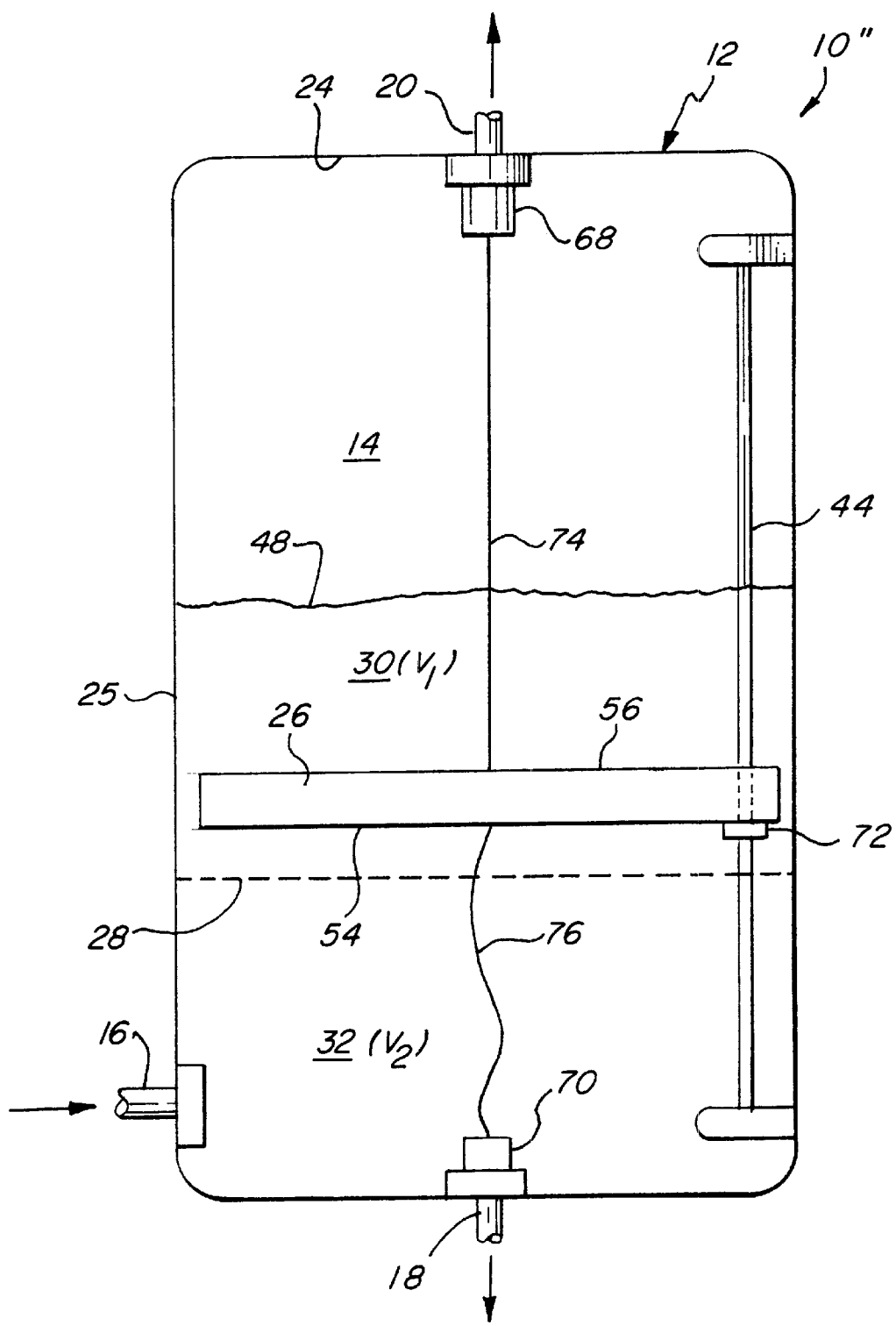
FIG. 3 illustrates a liquid separator comprising a third embodiment of the present invention.

A third embodiment of the invention is provided by the liquid separator 10" shown in FIG. 3. Liquid separator 10" is well suited for use in treating mixtures containing a relatively low proportion of first liquid (e.g., water) to second liquid (e.g., oil). Components of liquid separator 10" corresponding to those of FIG. 1 are identically numbered thereto and function is substantially the same way, and therefore are not further described herein. In FIG. 3, the valve rods 34, 36 of the embodiment of FIG. 1 are replaced by flexible connectors 74, 76, such as wires. One end of the second flexible connector 74 is connected to the top 56 of the float 26 and the other end is connected to a second valve 68. One end of the first flexible connector 76 is connected to the bottom 54 of the float 26 and the other end is connected to a first valve 70.

Figure 4B:
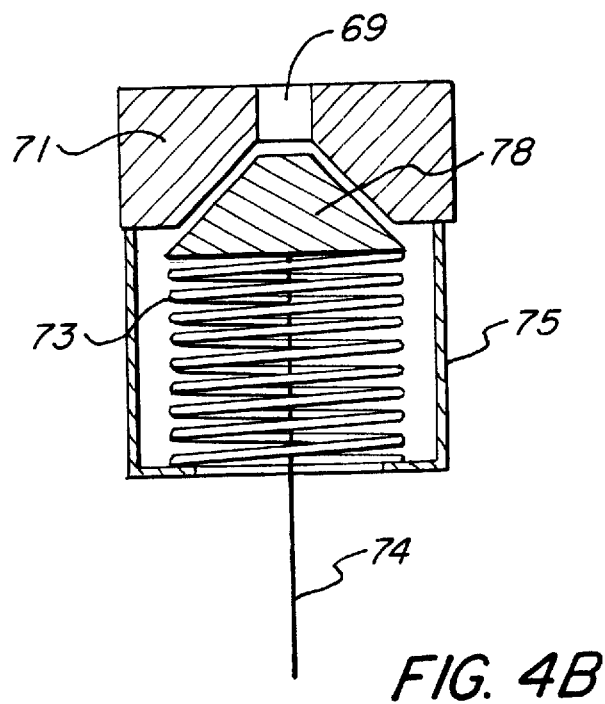

FIG. 4B illustrates a normally closed valve 68 which may be used in the second liquid outlet 20 of liquid separator 10" of FIG. 3. Valve 68 has a Y-shaped outlet channel 69 formed in a block 71, a coil spring 73 retained by a spring cage 75, and a valve closure member 78. Spring cage 75 is designed so that liquid may readily flow through it. Thus, spring cage 75 may be made of bars, a screen or a perforate cylinder. The distal end of second flexible connector 74 is attached to valve closure member 78. Coil spring 73 is compressed within spring cage 75 and biases closure member 78 into channel 69 to close valve 68. When the liquid phase interface 28 is located at or below a stop 72 which is fixed on guide rod 44, sufficient tension is imposed second flexible connector 74 to pull closure member 78 against the biasing action of coil spring 73 and open valve 68 to the flow of second liquid, e.g., oil, therethrough. Flow 26 is prevented from descending closer to bottom 22 by stop 72. First valve 70 in first liquid outlet 18 may be a normally closed valve identical in construction to first valve 68. The first flexible connector 76 is connected between the bottom 54 of the float 26 and a first valve closure member 78 (as in FIG. 4B) in a first valve 70. Because the first flexible connector 76 is slack, the first valve 70 would remain closed. When the first liquid or water phase 32 increases relative to the second liquid or oil phase 30, the interface 28 rises and causes the float 26 to rise. The rising float causes the first flexible connector 76 to become tensioned and opens the first valve 70 by pulling closure member 78 to its open position against the biasing force of coil spring 73. The rising float 26 also causes the second flexible connector 74 to become slack and this enables coil spring 73 to close the second valve 68. The operation of the liquid separator 10" of FIG. 3 is similar to that of the liquid separator 10' of FIG. 2 where the second valve closure member 38 is in close proximity to the second valve 56.

Generally, as noted above, valves (not shown) may be provided in the liquid inlet 16, first liquid outlet 18 and second liquid outlet 20. Baffles in addition to baffles 42 shown in FIG. 1 may be located within separation chamber 14 to control and slow the flow of mixed first and second liquids and facilitate the separation of the immiscible liquids into discrete liquid phases. The invention may also be adapted to separate more than two liquids, e.g., three liquids, by providing three liquid outlets appropriately positioned one above the other in housing 12. The liquid separator may be used partially or fully submerged in a liquid, such as ocean water, by being equipped with suitable one-way flow check valves. If necessary, one or more of the liquid outlets may be connected to suction pumps to withdraw the separated liquids from housing 12.

While the invention has been described in detail with respect to specific preferred embodiments thereof, numerous modifications to these specific embodiments will occur to those skilled in the art upon a reading and understanding of the foregoing description; such modifications are embraced within the scope of the appended claims.

What is claimed is:

1. A liquid separator for separating a mixture of immiscible liquids comprising a first liquid having a specific gravity which is greater than that of a second liquid, the liquid separator comprising:

a housing defining a separation chamber and having a liquid inlet for introducing into the separation chamber a mixture of the first and second liquids;

a first liquid outlet is formed in the housing and has a first valve positioned therein to control the flow therethrough of the first liquid, the first valve comprising a first closure member which is movable between a valve-opening position and a valve-closing position;

a second liquid outlet is formed in the housing above the first liquid outlet and has a second valve positioned therein to control the flow therethrough of the second liquid, the second valve comprising a second closure member which is movable between a valve-opening position and a valve-closing position;

at least one float is contained within the separation chamber and is mounted to translate in a vertical direction therein, the float having a specific gravity between the specific gravities of the first liquid and the second liquid;

a first valve control member connecting the float to the first valve closure member to move the first valve closure member (i) from its valve-opening position towards its valve-closing position as the float translates vertically downwardly, and (ii) from its valve-closing position towards its valve-opening position as the float translates vertically upwardly;

a second valve control member connecting the float to the second valve closure member to move the second valve closure member (i) from its valve-opening position towards its valve-closing position as the float translates vertically upwardly, and (ii) from its valve-closing position towards its valve-opening position as the float translates vertically downwardly;

whereby, separation of the mixture of immiscible liquids forms within the separation chamber a discrete phase of the first liquid having a volume $V_1$ and a discrete phase of the second liquid having a volume $V_2$ and a liquid interface between the phases that moves vertically within the separation chamber as determined by the respective volumes of the separated first and second liquids contained therein, such vertical movement imposed on the float serving to the second valve when $V_1/V_2$ exceeds a first selected value and serving to close the first valve when $V_1/V_2$ is below a second selected value which is less than the first selected value.

2. The liquid separator as defined in claim 1 further including a guide device mounted within the separation chamber, the valve control members being received within the guide device to align the first and second valve closure members with, respectively, the first and second valves.

3. The liquid separator as defined in claim 1 or claim 2 wherein the first valve control member comprises a first valve rod, and the second valve control member comprises a second valve rod.

4. The liquid separator as defined in claim 1 further comprising a float guide attached to the housing within the separation chamber, the float being slidably attached to the float guide to guide movement float and thereby movement of the first and second valve control members to align the first and second closure members with, respectively, the first and second valves.

5. The liquid separator as defined in claim 1 wherein the valve control member includes at least one flexible connector between the float and at least one valve.

6. The liquid separator as defined in claim 1 further comprising one or more baffles in the separation chamber interposed between the liquid inlet and the second liquid outlet.

7. The liquid separator as defined in claim 1 wherein the first valve is normally closed and the second valve is a normally open.

8. The liquid separator as defined in claim 7 further including a pressure-closing device in the second valve.

9. The liquid separator as defined in claim 1 wherein the liquid inlet is mounted above the float.

10. The liquid separator as defined in claim 1 further comprising one or more drain channels in the float for the passage of liquid through the float.

* * * * *